United States Patent Office 2,849,505
Patented Aug. 26, 1958

2,849,505

ALKYLATION CATALYST COMPRISING A TIN HALIDE AND METALLIC ALUMINUM

Louis Schmerling, Riverside, Ill., assignor to Universal Oil Products Company, Des Plaines, Ill., a corporation of Delaware No Drawing. Application July 18, 1955
Serial No. 522,843

10 Claims. (Cl. 260—666)

This invention relates to a process for the alkylation of an alkylatable compound in the presence of a novel catalyst. More particularly, this invention relates to the alkylation of an alkylatable hydrocarbon with an alkylating agent at alkylating conditions in the presence of an alkylation catalyst comprising a tin halide and metallic aluminum.

An object of this invention is to produce alkylated compounds, and particularly to produce alkylated hydrocarbons. A specific object of this invention is the production of substantially saturated gasoline boiling range paraffinic hydrocarbons having high antiknock values which may be utilized as such or as components of gasoline suitable for use in airplane and automobile engines. Another specific object of this invention is the production of alkylated aromatic hydrocarbons which may be utilized as such or as components of gasoline suitable for use in airplane and automobile engines. A still further object of this invention is the production of alkylated aromatic compounds useful per se or as intermediates in the production of plastics, resins, and other organic materials. Thus, a further specific object of this invention is the production of cumene by the alkylation of benzene with propylene in the presence of a novel catalyst, which cumene product may then be oxidized to form cumene hydroperoxide which may be decomposed into phenol and acetone. Also, another object of this invention is to furnish a process for the alkylation of p-cresol with tertiary butyl alcohol to form 2,6-di-tert-butyl-4-methylphenol which is a very effective antioxidant for preventing the deterioration of organic substances due to oxygen. Other objects of this invention will be noted hereinafter as part of the specification and accompanying examples.

Numerous catalysts have been proposed for the alkylation of alkylatable compounds with alkylating agents including liquid catalysts such as sulfuric acid, phosphoric acid, fluosulfonic acid, chlorosulfonic acid, hydrogen fluoride, etc., and solid catalysts usch as aluminum chloride, aluminum bromide, metal oxides, metal sulfides, clays, etc. Each of the prior art catalysts has suffered from at least one inherent disadvantage and it is a further object of this invention to provide an alkylation catalyst which can be used in systems and in reactions where prior art catalysts are unsatisfactory. Use of the novel catalyst composition of the present invention overcomes disadvantages which are well known to one skilled in the art.

In one embodiment the present invention relates to the alkylation of an alkylatable compound with an alkylating agent at alkylating conditions in the presence of an alkylation catalyst comprising a tin halide and metallic aluminum.

Another embodiment of the present invention relates to the alkylation of an alkylatable hydrocarbon with an alkylating agent at alkylating conditions in the presence of an alkylation catalyst comprising a tin halide and metallic aluminum.

A further embodiment of this invention relates to the alkylation of an alkylatable paraffinic hydrocarbon with an alkylating agent at alkylating conditions in the presence of an alkylation catalyst comprising a tin halide and metallic aluminum.

A still further embodiment of this invention relates to the alklation of an alkylatable aromatic hydrocarbon with an alkylating agent at alkylating conditions in the presence of an alkylation catalyst comprising a tin halide and metallic aluminum.

An additional embodiment of this invention relates to the alkylation of an alkylatable unsaturated hydrocarbon with an alkylating agent at alkylating conditions in the presence of an alkylation catalyst comprising a tin halide and metallic aluminum.

A specific embodiment of this invention relates to the alkylation of toluene with ethylene at alkylating conditions in the presence of an alkylation catalyst comprising stannous chloride dihydrate and metallic aluminum.

Another specific embodiment of the present invention relates to the alkylation of isobutane with propylene at alkylating conditions in the presence of an alkylation catalyst comprising stannous chloride dihydrate and metallic aluminum.

An additional specific embodiment of the present invention relates to the alkylation of methylcyclohexane with ethylene at alkylating conditions in the presence of a catalyst comprising stannous chloride dihydrate and metallic aluminum.

An additional specific embodiment of the present invention relates to the alkylation of phenol with isobutylene at alkylating conditions in the presence of an alkylation catalyst comprising stannous chloride dihydrate and metallic aluminum.

A further specific embodiment of the present invention relates to the alkylation of methylcyclohexane with ethylene at alkylating conditions in the presence of a catalyst comprising stannic chloride pentahydrate and metallic aluminum.

Other embodiments of the present invention will become apparent in considering the specification as hereinafter set forth.

I have found that a catalyst composition useful for the alkylation of alkylatable compounds may be prepared by mixing metallic aluminum and a tin halide. As will be illustrated in the examples appended to the present specification, the catalyst of the present invention gives results different than by the use of a tin halide alone. The tin halide utilized in this catalyst composition may be selected from a large group of stannic and stannous halides including chlorides, bromides, and iodides. These stannic and stannous halides may be utilized in forming the catalyst composition of the present invention as such or in their hydrated forms. Examples of specific tin halides which may be admixed with metallic aluminum include stannic chloride, stannic chloride pentahydrate, stannic oxychloride, stannic bromide, stannic iodide, etc., stannous chloride, stannous chloride dihydrate, stannous bromide, etc. While these various tin halides can be used interchangeably, the results obtained by the utilization of any specific one are not necessarily equivalent to the results obtained with any other and it has been found necessary to alter the alkylating conditions as the activity of the particular tin halide selected varies in combination with the metallic aluminum. Preferred tin halides are stannous chloride dihydrate and stannic chloride pentahydrate. An additional feature of the present invention is that the catalyst may be utilized as a solid mass or as a composite with a suitable supporting material. In some cases, the tin halide is soluble in the reactants utilized and thus the reactants, including the dissolved tin halide, can be passed over a solid bed of metallic aluminum in a continuous type of operation. In some instances it may be desirable to add a hydrogen halide corresponding to or different from the tin halide selected, in addition to the present catalyst, to obtain the particular type of alkylation process desired. Such hydrogen halides include hydrogen chloride, hydrogen bromide, and in some cases, hydrogen iodide. Hydrogen chloride and hydrogen bromide are the preferred hydrogen halides. It is understood furthermore that certain halogen containing compounds which release hydrogen halide under reaction conditions may be utilized in place of or along with the hydrogen halide. Examples of suitable halogen containing compounds are the alkyl halides, including alkyl chlorides, alkyl bromides, and alkyl iodides. Specific alkyl halides include ethyl chloride, propyl chlorides, butyl chlorides, pentyl chlorides, hexyl chlorides, etc., ethyl bromide, propyl bromides, butyl bromides, pentyl bromides, etc., ethyl iodide, propyl iodides, butyl iodides, pentyl iodides, etc., or mixtures thereof. It is understood that polyhaloalkane compounds, halocyclic compounds, and/or polyhalocyclic compounds may be utilized in some cases.

As hereinbefore set forth, the novel catalyst for the alkylation of alkylatable compounds reaction process of the present invention comprises a tin halide and metallic aluminum. As will be illustrated in the following examples, the tin halide alone is not a catalyst for certain alkylation reactions and it is only the combination of the tin halide and metallic aluminum which serves to catalyze these reactions. For example, stannous chloride dihydrate is not itself a catalyst for the alkylation of aromatic hydrocarbons with olefins; however, in combination with metallic aluminum, alkylation takes place. The proportions of aluminum and tin halide may vary over a fairly wide range, as, for example, from about 0.1 to about 2 moles and even more of aluminum per mole of tin halide. The specific proportions will depend upon the particular tin halide utilized, such a determination being well within the skill of one experienced in this art.

As hereinabove set forth, the present invention relates to a process for the alkylation of an alkylatable compound with an alkylating agent at alkylating conditions in the presence of an alkylation catalyst comprising a tin halide and metallic aluminum. Many different classes of compounds can be alkylated by the process of this invention. Among such classes of compounds are paraffin hydrocarbons including isoparaffinic hydrocarbons and naphthenic hydrocarbons (the latter containing one or more alkyl groups), aromatic hydrocarbons, phenols, aromatic amines, aromatic halogen compounds, aromatic carboxylic acids, aromatic halides, and aromatic ketones. For the purposes of this specification and the claims attached hereto, unsaturated hydrocarbons such as olefins are included among the classes of alkylatable compounds. Olefins are defined thusly since reaction with themselves results in the formation of polymers if the alkylating agent is the same as the olefin being alkylated, and results in the formation of co-polymers if the alkylating agent is different from the olefin reactant. Among these classes of alkylatable compounds, hydrocarbons are preferred, and particularly, aromatic hydrocarbons are preferred. The remaining alkylatable compounds are further not necessarily equivalent so that different reaction conditions may be necessary to involve them in reaction with the alkylating agents hereinafter set forth in the presence of the novel catalyst of this invention.

Many paraffin hydrocarbons are utilizable as starting materials, that is, alkylatable compounds, in the process of this invention. Suitable paraffin hydrocarbons include isobutane, isopentane, 2-methylpentane, 3-methylpentane, 2,3-dimethylbutane, 2-methylheptane, 3-methylheptane, etc. n-Paraffin hydrocarbons such as n-butane, n-pentane, n-hexane, etc., may also be used provided that the reaction conditions lead to their isomerization to isoparaffin hydrocarbons prior to alkylation. Since the catalyst of the present invention is extremely active, such combination isomerization-alkylation reactions are not surprising and thus within the generally broad scope of this invention. Isobutane is the isoparaffin commonly subjected to alkylation commercially, although higher molecular weight isoparaffins also react with alkylating agents under similar or modified conditions of operation to produce branched chain paraffinic hydrocarbons of higher boiling point than the isoparaffinic hydrocarbons charged to the process. However, as the higher molecular weight isoparaffins such as isopentane, isohexane, etc., are themselves valuable constituents of gasoline, they are consequentially used less commonly than isobutane as charging stocks for the alkylation process. Of the various naphthenic hydrocarbons which may be alkylated in the presence of the catalyst described herein to produce naphthenic hydrocarbons of more highly branched chain structure, methylcyclohexane, and its alkyl derivatives are commonly employed in such alkylation; cyclopentane and cycloheptane and their alkyl derivatives may also be utilized to advantage. The resulting alkylates are utilizable as constituents for high antiknock gasoline.

Many aromatic compounds are utilizable as alkylatable compound starting materials. Preferred aromatic compounds are aromatic hydrocarbons, and particularly monocyclic aromatic hydrocarbons, that is, benzene hydrocarbons. Suitable aromatic hydrocarbons include benzene, toluene, o-xylene, m-xylene, p-xylene, ethylbenzene, 1,2,3-trimethylbenzene, mesitylene, o-ethyltoluene, m-ethyltoluene, p-ethyltoluene, n-propylbenzene, cumene, etc. Higher molecular weight alkylaromatic hydrocarbons are also suitable such as those produced by the alkylation of aromatic hydrocarbons with olefinic polymers. Such products are referred to in the art as alkylate, and include hexylbenzene, hexyltoluene, nonylbenzene, nonyltoluene, dodecylbenzene, dodecyltoluene, etc. Very often alkylate is obtained as a high boiling fraction in which the alkyl group attached to the aromatic hydrocarbon varies in size from $C_9$ to $C_{18}$. Other suitable alkylatable aromatic hydrocarbons include those containing an unsaturated side chain such as styrene, vinyltoluene, allylbenzene, etc. Still other suitable utilizable aromatic hydrocarbons include those with two or more aryl groups such as diphenyl, diphenylmethane, triphenylmethane, fluorene, stilbene, etc. Examples of suitable alkylatable aromatic compounds which contain condensed benzene rings include naphthalene, anthracene, phenanthrene, naphthacene, rubrene, etc. Indene may also be used.

Aromatic hydrocarbon derivatives as hereinabove set forth may also be used as starting materials in the process of this invention. Furthermore, unsaturated hydrocarbons such as olefins have been classified for the purposes of this specification and the appended claims as alkylatable compounds. Such unsaturated hydrocarbons include ethylene, propylene, 1-butene, 2-butene, isobutylene, pentenes, hexenes, etc., acetylene, methyl acetylene, etc.

Furthermore, by the term alkylatable aromatic compound, I means to include not only benzene derivatives, naphthalene derivatives and the like, but also all aromatic compounds containing a stable ring or nucleus such as is present in benzene, and which possess unsaturation in the sense that benzene does. Consequently, it can be seen that the term aromatic compound, in the sense in which it is used in this specification and the appended claims, includes not only carbocyclic compounds, but also heterocyclic compounds having a stable nucleus. The carbocyclic compounds may have a benzene, naphthalene, anthracene, etc. nucleus. The heterocyclic aromatic compounds may have a pyridine, furan, thiophene, pyrrole, pyrazole, etc., nucleus. In addition, the aromatic compounds contemplated for use in my process may contain both a carbocyclic and a heterocyclic ring such as is found in indole and carbazole. Also, the aromatic compounds may contain both a benzene nucleus and a saturated ring such as is found in tetralin and in indan.

Suitable alkylating agents which may be charged in this process are olefin-acting compounds including monoolefins, diolefins, and polyolefins, as well as alcohols, ethers, esters, the latter including alkyl halides and polyhaloalkanes (the preferred halogen being chlorine and bromine), alkyl phosphates, certain alkyl sulfates, and also esters of various organocarboxylic acids. The preferred olefin-acting compounds are olefinic hydrocarbons which comprise monoolefins having one double bond per molecule and polyolefins which have more than one double bond per molecule. Monoolefins which may be utilized for alkylating alkylatable compounds in the presence of a catalyst comprising a tin halide and metallic aluminum are either normally gaseous or normally liquid and include ethylene, propylene, 1-butene, 2-butene, isobutylene, pentenes, hexenes and higher normally liquid olefins, the latter including various olefin polymers having from about 6 to about 18 carbon atoms per molecule. Cyloolefins such as cyclopentene, cyclohexene, and various alkylcycloolefins such as methylcyclopentene, methylcyclohexene, etc., and polycyclic olefins such as bicyclo[2.2.1]-2-heptene may also be utilized but generally not under the exact same conditions of operation applying to the non-cyclic olefins. The polyolefinic hydrocarbons utilizable in the process of the present invention include conjugated diolefins such as butadiene and isoprene, as well as non-conjugated diolefins and other polyolefinic hydrocarbons containing more than two double bonds per molecule.

Alkylation of the above alkylatable compounds may also be effected in the presence of the hereinabove referred to catalyst by reacting alkylatable compounds, particularly alkylatable hydrocarbons, with certain substances capable of producing olefinic hydrocarbons, or intermediates which act as olefinic hydrocarbons, under the conditions of operation chosen for the process. Such latter substances include alkyl halides capable of undergoing dehydrohalogenation to form olefinic hydrocarbons containing at least two carbon atoms per molecule. The alkyl halides comprise a particularly desirable proup of alkylating agents which act as olefins in admixture with alkylatable compounds in the presence of the catalyst of the present invention. Suitable alkyl halides include ethyl chloride, ethyl bromide, n-propyl chloride, n-propyl bromide, isopropyl chloride, isopropyl bromide, n-butyl chloride, n-butyl bromide, isobutyl chloride, isobutyl bromide, sec-butyl chloride, sec-butyl bromide, tert-butyl chloride, tert-butyl bromide, amyl chlorides, amyl bromides, etc., the latter including the various possible isomeric forms of such compounds. Polyhaloalkanes which may be used include 1,3-dichloro-3-methylbutane, 1,1-dichloro-3,3-dimethylbutane, etc. Other suitable alkylating agents include alcohols, which can be dehydrated to form olefinic hydrocarbons containing at least two carbon atoms per molecule. Examples of such alcohols are ethyl alcohol, n-propyl alcohol, isopropyl alcohol, n-butyl alcohol, isobutyl alcohol, sec-butyl alcohol, tert-butyl alcohol, amyl alcohols, etc. As set forth hereinabove, ethers such as ethyl ether, anisole, etc., alkyl phosphates, and certain alkyl sulfates as well as esters of various carboxylic acids may also be utilized as alkylating agents. In each case, the olefinic hydrocarbons and the above-mentioned olefin-producing substances are herein referred to as alkylating agents.

In accordance with the process of this invention, the alkylation of alkylatable compounds reaction to produce alkylated compounds of higher molecular weight than the compounds charged to the process is effected in the presence of the above-indicated catalyst at a temperature of from about room temperature to about 400° C. or higher, and preferably at a temperature from about 100° to about 300° C., although the exact temperature needed for a particular alkylation reaction will depend upon the specific reactants employed.

The alkylation reaction is usually carried out at a pressure of from about substantially atmospheric to about 100 atmospheres, and preferably under sufficient pressure to maintain the reactants and the products in substantially liquid phase. Referring to the alkylatable compound subjected to the alkylation reaction, it is preferable to have present from 1 to 10 or more, sometimes up to 20 molecular proportions of alkylatable compound per one molecular proportion of alkylating agent introduced thereto, particularly olefinic hydrocarbon. The higher molecular ratios of alkylatable compound to olefin are especially desirable when the olefin employed in the alkylation is a high molecular weight olefin boiling generally higher than pentenes, since these olefins frequently undergo depolymerization prior to or substantially simultaneously with alkylation so that one molecular proportion of such an olefin can thus alkylate two or more molecular proportions of the alkylatable compound. The higher molecular ratios of alkylatable compound to olefin also tend to reduce the formation of polyalkylated products because of the operation of the law of mass action under these conditions. In some cases it may be desirable to maintain or employ an atmosphere of hydrogen within the reaction.

In converting alkylatable compounds with the type of catalysts herein described, either batch or continuous operations may be employed. The actual operation of the process admits of some modification depending upon the normal phase of the reacting constituents in such batch or continuous operation. In a sample type of batch operation an aromatic compound to be alkylated, such as, for example, benzene, is brought to a temperature and pressure within the approximate range specified in the presence of a catalyst comprising a tin halide, such as stannous chloride dihydrate, and metallic aluminum and its alkylation is effected by the gradual introduction under pressure of an olefin such as, for example, isobutylene in a manner to attain contact between catalyst and reactants. In carrying out the reaction in such a batch type operation, the amount of aluminum utilized ranges from about 1 to about 10% by weight of the material to be alkylated. The amount of aluminum utilized in forming the catalyst of the present invention in relation to the amount of tin halide utilized has been set forth hereinabove.

In another manner of operation, the alkylatable compound may be mixed with an olefin at a suitable temperature, the catalyst comprising a tin halide and metallic aluminum is added and the reaction of alkylation induced by a sufficiently long contact with the catalyst. Alkylation may be allowed to progress to different stages depending upon contact time. In the case of the alkylation of benzene, the best products are obtained or produced by the condensation of equimolecular quantities of alkylatable aromatic compound and olefin. After a batch treatment, the catalyst is removed in any suitable manner such as by filtration and washing with water to purify the organic product layer, which latter organic product layer may be subjected to fractionation for the recovery of the desired reaction products.

In one type of continuous operation, a liquid aromatic hydrocarbon such as toluene, containing dissolved therein a requisite amount of tin halide, may be pumped through a reactor containing the metallic aluminum disposed in the form of a bed. The alkylating agent may be added to the aromatic compound stream just prior to contact of this stream with the metallic aluminum bed, or it may be introduced in multistages at various points in the metallic aluminum bed. It is also within the scope of the present invention, when the tin halide utilized is insoluble in the compound to be alkylated, to dispose the tin halide along with the metallic aluminum in a fixed bed for continuous type operation. The details of continuous processes of this general character are familiar to those skilled in the alkylation art and any necessary additions or modifications of the above general procedures will be more or less obvious and can be made without departing from the generally broad scope of this invention. For example, instead of utilizing an amount of catalyst based on the weight of compound to be alkylated, in continuous operation, the hourly liquid space velocity is varied so that satisfactory contact between the catalyst and the reactants is obtained. In processes of this general character, hourly liquid space velocities are normally from about 0.1 to about 10 or higher.

The process of the present invention is illustrated by the following examples which are introduced for the purpose of illustration and with no intention of unduly limiting the generally broad scope of the present invention.

*Example I*

This experiment was carried out utilizing a rotatable knife closure autoclave (850 ml. capacity) as the reactor. To this autoclave, equipped with a glass liner was charged a mixture of 100 grams of toluene, 20 grams of stannous chloride dihydrate, and 10 grams of granular aluminum metal. The autoclave was closed and ethylene added thereto from a cylinder until a reactor pressure of 40 atmospheres had developed. The autoclave was then rotated and heated for four hours time at 200–300° C.

After cooling, the ethylene pressure had dropped to 21 atmospheres. This residual ethylene was discharged and 113 grams of liquid product was recovered along with about 36 grams of solid catalyst layer. Distillation of the liquid product yielded about 20 grams of ethyltoluenes, about 20 grams of diethyltoluenes, and about 10 grams of higher boiling alkylation product, in addition to unreacted toluene which can be reused in the process.

*Example II*

Little or no alkylation occurred under the same reaction conditions as Example I but in the absence of the aluminum. Heating 100 grams of toluene and 20 grams of stannous chloride dihydrate under 40 atmospheres initial ethylene pressure in the above-described manner yielded liquid product containing only 4.5 grams of material of higher boiling point than toluene. Of this less than 1 gram boiled in the range of ethyltoluene and di-ethyltoluene; the remainder was dark, high boiling residue. This material had a refractive index which indicated the presence of ethylene polymer.

*Example III*

An experiment was carried out in a manner similar to that of Example I except that stannic chloride pentahydrate was used instead of stannous chloride dihydrate. There was recovered 106 g. of liquid product and 30 g. of amber solid. Distillation of the washed liquid yielded, besides unreacted toluene, about 16 g. of ethyltoluene, about 8 g. of diethyltoluenes, and about 9 g. of higher boiling alkylated toluene.

That the recovered solid was an active catalyst was shown by adding a mixture of benzene and tert-butyl chloride to a small portion at room temperature. Hydrogen chloride was evolved and crystalline p-di-tert-butylbenzene separated from the mixture.

*Example IV*

The alkylation of methylcyclohexane with ethylene in the presence of stannous chloride dihydrate and aluminum was carried out by the same procedure as that of Example I, methylcyclohexane being used instead of toluene. A complex mixture of products including ethylmethylcyclohexanes, trimethylcyclohexanes and tetramethylcyclopentanes was obtained.

I claim as my invention:

1. A process which comprises alkylating an alkylatable compound with an alkylating agent at alkylating conditions in the presence of an alkylation catalyst comprising a tin halide and metallic aluminum.

2. A process which comprises alkylating an alkylatable hydrocarbon with an alkylating agent at alkylating conditions in the presence of an alkylation catalyst comprising a tin halide and metallic aluminum.

3. A process which comprises alkylating an alkylatable paraffinic hydrocarbon with an alkylating agent at alkylating conditions in the presence of an alkylation catalyst comprising a tin halide and metallic aluminum.

4. A process which comprises alkylating an alkylatable cycloparaffinic hydrocarbon with an alkylating agent at alkylating conditions in the presence of an alkylation catalyst comprising a tin halide and metallic aluminum.

5. A process which comprises alkylating an alkylatable aromatic hydrocarbon with an alkylating agent at alkylating conditions in the presence of an alkylation catalyst comprising a tin halide and metallic aluminum.

6. A process which comprises alkylating an alkylatable olefinic hydrocarbon with an alkylating agent at alkylating conditions in the presence of an alkylation catalyst comprising a tin halide and metallic aluminum.

7. A process which comprises alkylating an alkylatable compound with an alkylating agent at a temperature of from about room temperature to about 400° C. and at a pressure of from about atmospheric to about 100 atmospheres in the presence of an alkylation catalyst comprising stannous chloride dihydrate and metallic aluminum.

8. A process which comprises alkylating an alkylatable hydrocarbon with an alkylating agent at a temperature of from about room temperature to about 400° C. and at a pressure of from about atmospheric to about 100 atmospheres in the presence of an alkylation catalyst comprising stannous chloride dihydrate and metallic aluminum.

9. A process which comprises alkylating an alkylatable aromatic hydrocarbon with an alkylating agent at a temperature of from about 100° to about 300° C. and at a pressure of from about atmospheric to about 100 atmospheres in the presence of an alkylation catalyst comprising stannous chloride dihydrate and metallic aluminum.

10. A process which comprises alkylating an alkylatable olefinic hydrocarbon with an alkylating agent at a temperature of from about 100° to about 300° C. and at a pressure of from about atmospheric to about 100 atmospheres in the presence of an alkylation catalyst comprising stannous chloride dihydrate and metallic aluminum.

References Cited in the file of this patent

UNITED STATES PATENTS

| Number | Name | Date |
|---|---|---|
| 2,236,099 | Ipatieff et al | Mar. 25, 1941 |
| 2,271,956 | Ruthruff | Feb. 3, 1942 |
| 2,361,356 | Sachanen et al. | Oct. 24, 1944 |
| 2,435,691 | Myers et al. | Feb. 10, 1948 |
| 2,436,774 | Nutting et al. | Feb. 24, 1948 |
| 2,436,868 | Lebedeff | Mar. 2, 1948 |

OTHER REFERENCES

Darzen, Comptes Rendus, vol. 150, 1910, p. 707–710.
Stadnikoff et al., Berichte, vol. 61, 1928, p. 1996.